United States Patent [19]

Chen et al.

[11] Patent Number: 5,045,210

[45] Date of Patent: * Sep. 3, 1991

[54] HEAVY METAL REMOVAL PROCESS

[75] Inventors: Wei-Chih Chen, Meriden; Michael A. Michaud, Middletown; Kenneth C. Hou, S. Glastonbury, all of Conn.

[73] Assignee: Cuno, Incorporated, Meriden, Conn.

[*] Notice: The portion of the term of this patent subsequent to Mar. 13, 2007 has been disclaimed.

[21] Appl. No.: 447,873

[22] Filed: Dec. 8, 1989

Related U.S. Application Data

[63] Continuation-in-part of Ser. No. 336,164, Apr. 11, 1989, Pat. No. 4,908,137.

[51] Int. Cl.$^5$ ............................................. C02F 1/12
[52] U.S. Cl. ..................................... 210/679; 210/688
[58] Field of Search ......... 210/656, 679, 688, 912-914

[56] References Cited

U.S. PATENT DOCUMENTS

| 4,384,957 | 5/1983 | Crowder III et al. | 210/656 |
| 4,663,163 | 5/1987 | Hou et al. | 424/101 |
| 4,724,207 | 2/1988 | Hou et al. | 435/180 |
| 4,859,340 | 8/1989 | Hou et al. | 210/505 |
| 4,908,137 | 3/1990 | Chen et al. | 210/679 |

Primary Examiner—Ivars Cintins
Attorney, Agent, or Firm—Renner, Kenner, Greive, Bobak, Taylor & Weber

[57] ABSTRACT

An ion-exchange media comprising a modified polysaccharide material and a modified particulate polymeric material, said modified materials comprising a polysaccharide and particulate polymeric materials covalently bonded to a synthetic polymer, said synthetic polymer comprising a copolymer made from a polymerization of:

(a) a polymerizable compound having a chemical group capable of covalently coupling, directly or indirectly, to said materials; and (b) a polymerizable compound containing (i) an ionizable chemical group or (ii) a chemical group capable of transformation to an ionizable chemical group.

The media is useful to selectively remove heavy metal contaminants from aqueous solutions containing said contaminants.

11 Claims, 8 Drawing Sheets

FIG. 1A *PRIOR ART*
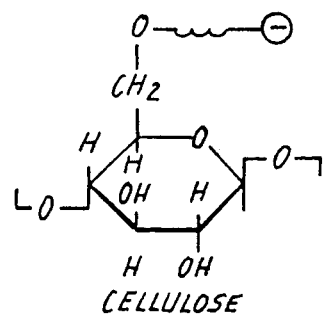
CELLULOSE
FIG. 1B
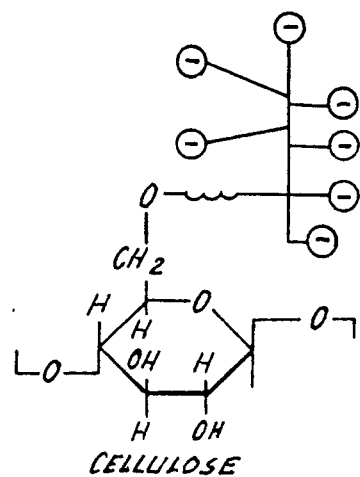
CELLULOSE
FIG. 2
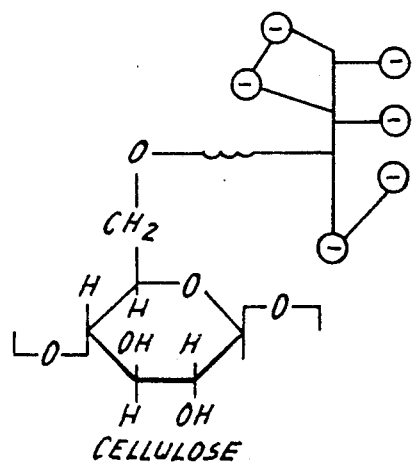
CELLULOSE

ACRYLIC COPLYMERS CARRYING HEAVY METAL ION-EXCHANGE FUNCTIONAL GROUPS

COMPONENT 1
GMA AS COUPLER

COMPONENT 2

GLYCIDYL METHACRYLATE      MAA OR AA

↓ POTASSIUM PERSULFATE
  SODIUM THIOSULFATE

COMPONENT 1: GMA OR GA

COMPONENT 2: MAA OR AA OR
β-CARBOXYL ETHYL ACRYLATE

PHTHALIC ACID MONO

METAL CHELATING GROUPS DERIVATIZED FROM GMA

1. DI-CARBOXYLIC GROUPS

2. TRI-CARBOXYLIC GROUPS

HEAVY METAL REMOVAL PROCESS

RELATED APPLICATIONS

This application is a continuation-in-part application of U.S. Ser. No. 07/336,164 filed on Apr. 11, 1989, now U.S. Pat. No. 4,908,137 entitled, "HEAVY METAL REMOVAL PROCESS". The entire disclosure of this application is incorporated herein by reference.

BACKGROUND OF THE INVENTION

1. Field of the Invention

The present invention relates to filters for the removal of heavy metals, processes for preparing such filters and the use of such filters for removing heavy metals from aqueous solutions contaminated therewith.

2. Prior Art

The broad applicability of ion exchange chromatography to separate inorganic ions, has made it a powerful and versatile tool for chemical separations. The technique originally used non-synthetic or natural compositions as ion exchange media, for example, cellulose, clay and other minerals which contained mobile ions that could be exchanged with ionic materials in the surrounding solute phase. Due to the low ion exchange capacity of such natural compositions which limited their use, synthetic organic ion-exchange polymers were developed.

Ion exchange resins were among the first generation of synthetic ion exchange materials. The fundamental structure of ion exchange resins is an elastic three-dimensional hydrocarbon network comprising ionizable groups, either cationic or anionic, chemically bonded to the backbone of a hydrocarbon framework. The network is normally fixed, insoluble in common solvents and chemically inert. The ionizable functional groups attached to the matrix carry active ions which can react with or can be replaced by ions in the solute phase. Therefore, the ions in the solute phase can be easily exchanged for the ions initially bound to the polymeric resins. Typical examples of commercially available ion exchange resins are the polystyrenes cross-linked with DVB (divinylbenzene), and the acrylates or methacrylates copolymerized with DVB. In the case of polystyrene, a three-dimensional network is formed first, and the functional groups are then introduced into the benzene rings through chloromethylation.

Cation ion exchangers have fixed anionic functional groups, e.g., $-CO_2-M+$, $-SO_3-M+$, $-PO_3=H_2+$. Anion ion exchangers have fixed cationic functional groups, e.g., $-NH_2$, $-NRH$, $-NR_2-$ $N+R3X-$.

Commercial ion-exchange resins are designed to have high practical capacities for their specific applications. Several major factors are considered in choosing an appropriate ion-exchange resin, e.g., selectivity, porosity, resin particle size, and flow rate.

After choosing an ion-exchange media with a high selectivity for a specific ion required to be exchanged, the next factor to consider is efficiency. Ion-exchange efficiency is determined by porosity and particle size. Porosity is controlled by the degree of swelling of the polymer matrix, which, in turn, is determined by the density of crosslinking. This swelling network permits the diffusion of ions in and out of the ion-exchange matrix. However, if the ions to be exchanged are large, the reaction can only take place on the media. To overcome this problem, ion exchange media with large fixed pores and/or large contact surfaces have been developed, e.g., rigid macroreticular ion-exchange materials, so that flocculants can be easily removed from or passed through the large pores. However, even with these improvements, such ion-exchange media still have disadvantages, for example, limited flow rates (<100 bed volume/hour), and channeling problems. When a high flow rate (>>100 bed volume/hour) is applied to an ion exchange bed comprising such media, the efficiency of the ion-exchange reaction is decreased due to shorter contact times resulting in incomplete reactions. The pressure drop is also increased across the bed.

Normally, coarse, rigid ion-exchange resins are used for high flow conditions to reduce problems associated with the high pressure drops experienced. Such ion exchange materials, however, show low efficiencies even for macroporous or macroreticular type ion exchange materials. Finer mesh ion-exchange materials give higher efficiencies, but cause higher operating pressures and high head losses during back washing. It is clear that the kinetics of the ion-exchange reaction depend on the porosity of the polymer matrix and the total contact surface area of the liquid-polymer interface. Thus, where high flow conditions apply, the macroporosity and the particle size become the most important factors.

As with every unit process, ion-exchange processes have their limitations and problems. However, new technologies can be developed to minimize these limitations and problems. These limitations are due to many factors, for example:

1. The nature of the ion-exchange material.
2. The ions involved.
3. The operating conditions.
4. The quality of effluent required.
5. The cost of the process.
6. The fouling and interfering species.

In heavy metal removal, it is desirable to remove one or several metal cations from solutions containing concentrations of other similar metal cations. Selectivity differences exist between ion-exchange materials. For example, the relative selectivity of carboxylic acid-sodium salt ligands and metal cations at pH 5 is:

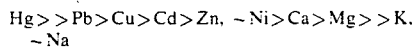

The relative selectivity of the ion-chelating group such as iminodiacetic acid linked to epoxy groups of poly (glycidyl acrylate) or poly (glycidyl methacrylate) coupled to a cellulose matrix at pH 4 is:

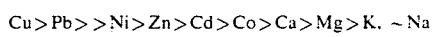

The relative selectivity of similarly immobilized ethylene diamine tetraacetic acid at pH 4 is:

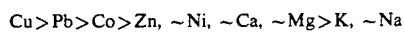

Thus, as can be seen, ion-exchange media with carboxylic acid, iminodiacetic acid, and ethylene diamine tetraacetic acid-sodium or potassium salts can remove heavy metals such as Pb, Cu, Cd and Zn, very efficiently from water containing calcium, magnesium, potassium and sodium ions. At a pH below 3, however, ionization of carboxylic acid is depressed and capacities are reduced.

At a pH higher than 8, heavy metal hydroxides precipitate and form colloids, with particle sizes of from about 0.05 to several hundred microns, depending on ion concentration and other water characteristics. When the pH is higher than 9, soluble anionic complexes or insoluble anionic colloids are formed, which depend on concentrations of metal ions, anionic ligands and the characteristics of the water. Both metal hydroxide colloids and anionic species cannot be exchanged with cation exchangers. Colloids are usually removed through mechanical filtration or absorption methods. Anionic colloids and complexes are usually removed through mechanical filtration and anion exchangers.

In an ammoniacal stream (pH=9) containing, for example, ammonium sulfate heavy metals such as Co, Ni, Cd, Cu and Zn form cationic complexes, which can be removed by chelation ion-exchangers.

The relative selectivity between cations of a sulfonated copolymer of styrene and divinylbenzene are close. Taking lithium as the base, the relative selectivity coefficients are as follows:

| Counter Ion | Relative Selectivity Coefficient |
|---|---|
| $Li^+$ | 1.00 |
| $H^+$ | 1.27 |
| $Na^+$ | 1.98 |
| $Mn^{2+}$ | 2.75 |
| $K^+$ | 2.90 |
| $Mg^{2+}$ | 3.29 |
| $Zn^{2+}$ | 3.47 |
| $Cu^{2+}$ | 3.85 |
| $Cd^{2+}$ | 3.88 |
| $Ca^{2+}$ | 5.16 |
| $Ag^+$ | 8.51 |
| $Pb^{2+}$ | 9.91 |

It is clear that this type of ion-exchange material cannot effectively remove trace heavy metal ions from water containing high concentrations of calcium and magnesium. Such an ion-exchange material only works well in the absence of or in the presence of only minor amounts of these interfering ions. Such ion-exchange media are primarily useful only at pH 2 and above. However, such material still cannot remove colloids and anionic species. The above cation exchange resins are normally regenerated with strong acid (5-10%). However, in the case of weak acid ion exchange resin (carboxylates), chelating regenerants, such as sodium citrate and ethylenediamine tetracetic acid (Na-salts) may be used to remove metal ions, the ion exchange resins being actually regenerated under basic conditions.

Weak bases such as $-NH_2$, $-NRH$ and $-NR_2$, and strong bases such as $-N^+R_3 X^-$ can remove anionic species from water, such as $Cl^-$, $SO_4^=$, $NO_3^-$, anionic colloidal particles, anionic complexes and anionic organic compounds. Thus, such ion exchange materials can be used for removal of anionic heavy metal complexes and colloids. Thus, in order to remove heavy metals from water, conditions such as pH and forms of heavy metal should be determined before choosing the type of ion-exchange media needed.

The foregoing review of the prior art, its advantages and drawbacks, leads to the conclusion that there exists a need for an ion exchange chromatography-based purification device which will have high stability, high porosity, high flow rate, be relatively incompressible and control gelation, in conjunction with high filtration efficiency for heavy metal removal at low and high pH.

It is the industrial level of manufacturing, especially where the aforementioned drawbacks have had their most important effect and where this need is the strongest.

Industrial scale separation materials comprising fibrous matrices with particulate immobilized therein are described in U.S. Pat. No. 4,384,957 to Crowder, III, et al (1983), which is incorporated herein by reference. Crowder describes a composite fiber material formed by wet laying a sheet from an aqueous slurry of ion-exchange resins or ion-exchange fibers, particulate, small refined fiber pulp and long soft fiber pulp. The purpose of the soft long fiber is to physically hold the clumps of particulate material and refined pulp together. Sheets are formed from a wet slurry by vacuum filtration, wherein the long fibers form in a plane which is perpendicular to the direction of flow of the chromatographic carrier fluid. This permits channels to form in the composite material which are perpendicular to the direction of flow, permitting these materials to serve as internal flow distributors. The resulting matrix structure has proven to be an effective way of eliminating channeling defects through internal flow distribution mechanisms.

U.S. Pat. No. 4,663,163 to Hou et al describes a modified polysaccharide material and U.S. Pat. No. 4,724,207 to Hou et al describes a modified silica material. Each of these materials are preferably modified by a synthetic polymer covalently bonded to the material. Preferably the synthetic polymer is a copolymer made from a free radical polymerization of:

(a) a polymerizable compound containing an epoxy group capable of direct covalent coupling to a hydroxy group of said polysaccharide and a vinyl group, capable of free-radical polymerization; and (b) a polymerizable compound having the formula

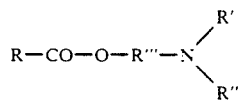

wherein R is an alpha, beta-unsaturated polymerizable radical, R' and R" are the same or different $C_1-C_6$ alkyl or alkanoyl groups, and R''' is a direct bond or a $C_2-C_3$ alkyl group, wherein R' and R" taken together with the N atom may form a heterocyclic ring.

The polymerizable compound (b) may also have the following formula:

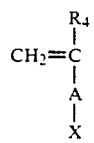

wherein
$R_4$ is hydrogen or methyl;
A is CO, or $SO_2$;
X is OH, OM (where M is a metal ion), $OR_5$ (where $R_5$ is a straight or branched chain $C_1-C_{18}$ alkyl group), $OR_6OH$ (where $R_6$ is a straight or branched chain $C_2-C_6$, alkyl or aromatic group), $NR_7R_8$ or $NR_7R_8R_9$ (where $R_7$ is the same or different as $R_8$ which is the same or different as $R_9$, and are hydrogen. $R_5$ or $R_6OH$);
AX may also have formula (5):

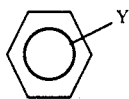

wherein Y is —CO₂—, —CH₂CO₂, —SO₃—, CH₂SO₃, —PO₄H—, CH₂PO₄H—, —CH₂N(CH₂COO—)₂, —CH₂—NR₇R₈, or —CH₂—NR₇R₈R₉, or the corresponding free acid, ester, or partial ester groups, as described previously.

In these formulas, the groups R₇, R₈; R₇, R₉; or R₈, R₉ may form a 5-7 membered heterocyclic ring with the nitrogen atom. R₇, R₈, and R₉ are as previously defined.

Hou et al, does not teach or suggest that such materials are useful for removing heavy metals from aqueous solutions contaminated therewith and does not teach or suggest the media of this invention.

OBJECTS AND SUMMARY OF THE INVENTION

It is an object of this invention to provide an ion exchange media useful for the selective removal of heavy metals from aqueous solutions contaminated therewith.

It is yet another object of this invention to provide a novel ion-exchange media which is effective in removing trace heavy metal ions from aqueous solutions contaminated therewith and containing high concentrations of calcium and magnesium.

It is still another object of this invention to provide an ion exchange media suitable for removal of colloids as well as colloidal metal precipitates.

It is yet another object of this invention to provide an ion exchange media which has high stability, high porosity, high flow rates, is relatively incompressible and has a high filtration efficiency for heavy metal ion removal from aqueous solutions contaminated therewith at both low and high pH.

Still another object of the invention is to provide industrial scale ion exchange chromatography.

Yet another object of the invention is to provide processes for the preparation of ion exchange media.

These and other objects of this invention are attained by providing an ion-exchange media comprising a modified polysaccharide material and a modified silica or modified particulate polymeric material, said modified materials comprising a polysaccharide and silica or particulate polymer material covalently bonded to a synthetic polymer, said synthetic polymer comprising a copolymer made from a polymerization of:

(a) a polymerizable compound having a chemical group capable of covalently coupling, directly or indirectly, to said materials; and (b) a polymerizable compound containing (i) an ionizable chemical group or (ii) a chemical group capable of transformation to an ionizable chemical group, for example, by linkage to iminodiacetic acid or ethylenediamine tetraacetic acid.

A preferred synthetic polymer is a copolymer made from a free radical polymerization of: (a) a polymerizable compound containing an epoxy group capable of direct covalent coupling to a hydroxy group of said polysaccharide and a vinyl group, capable of free-radical polymerization; and (b) a polymerizable compound having the formula

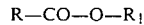

wherein R is an alpha, beta-unsaturated polymerizable radical and R₁ is H, —C₆H₅COOH or —C₂H₄COOH.

The aforedescribed media are useful as insoluble supports for selective heavy metal ion removal from aqueous solutions contaminated therewith.

The ion exchange media is a composite of an organic synthetic polymer bonded to a polysaccharide and a siliceous or particulate polymeric support material. The synthetic polymer has chemical groups capable of coupling to the polysaccharide and silica or particulate polymer, and chemical groups which provide ion exchange capacity.

The polymer coupled to the polysaccharide and silica or particulate polymer may be either a copolymer or a homopolymer. Preferably, the polymer is a copolymer containing groups capable of coupling to the polysaccharide and siliceous or particulate polymeric support material, and also different groups capable of serving as ion-exchange sites.

The invention also contemplates mixtures of the aforementioned materials with unmodified polysaccharides, with modified or unmodified particulate material, or mixtures thereof to give a variety of separation media.

BRIEF DESCRIPTION OF THE DRAWINGS

FIG. 1A is a diagram of a cation exchange cellulose derivatized by a prior art approach which yields one anionic site per saccharide unit.

FIG. 1B is a diagram of a cation exchange cellulose derivatized by the approach of this invention which yields multiple anionic sites per saccharide unit.

FIG. 2 is a diagram of a derivatized cation exchange cellulose of FIG. 1B after further crosslinking.

DETAILED DESCRIPTION OF THE INVENTION

Materials

Figure 3:
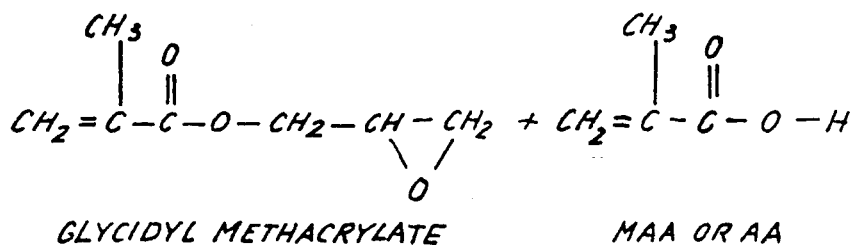
FIG. 3 is a diagram of an acrylic copolymer carrying heavy metal ion-exchange functional groups.
Figure 3:
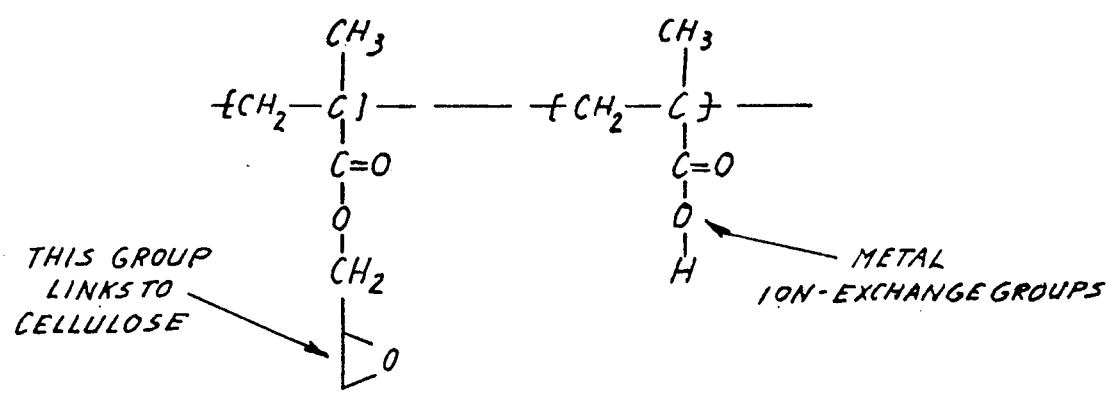
Figure 3:
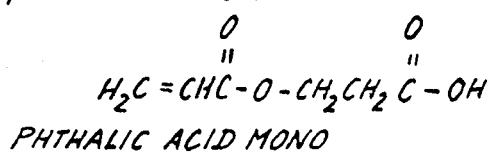
Figure 4:
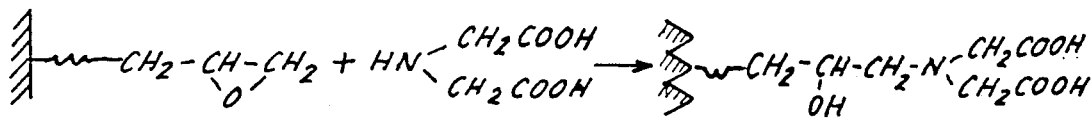
FIG. 4 is a diagram of metal chelating groups derivatized from GMA.
Figure 4:
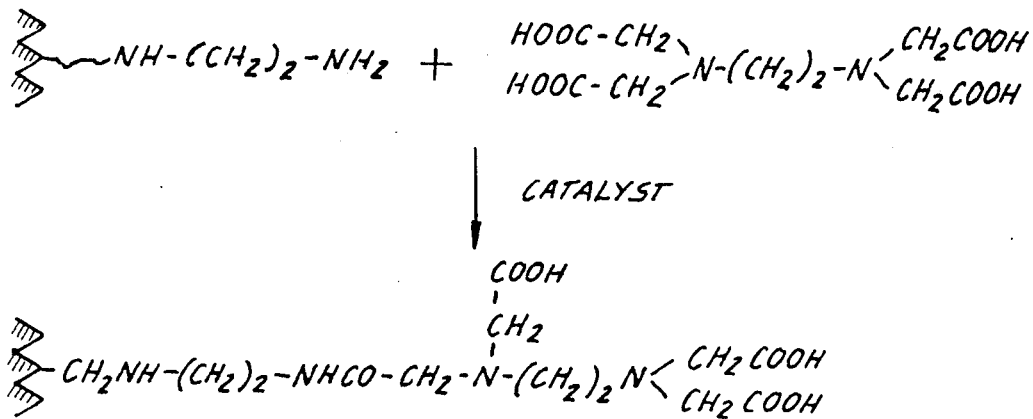

The term "polysaccharide" as used in the specification and claims is meant to include compounds made up of many hundreds, or even thousands, of monosaccharide units per molecule. These units are held together by glycoside linkages. Their molecular weights are normally higher than about 5,000 and up into the millions of daltons. They are normally naturally occurring polymers such as, for example, starch, glycogen, cellulose, gum arabic, agar and chitin. The polysaccharide should have one or more reactive hydroxy groups. It may be a straight or branched chain. The most useful of the polysaccharides for the purposes of this invention is cellulose.

The polysaccharide is preferably fully unprotected an carries all of its hydroxy groups in the free state. Some blocking of the hydroxy groups is possible, as for example by acylation or aminoacylation. If the masking of the polysaccharide hydroxy groups is too extensive, the reactivity of the resulting material with the polymer is greatly diminished. For all of these reasons, it is preferred to retain substantially all hydroxy groups in the free state. The polysaccharide may, however, be chemically activated, as seen infra.

Cellulose is the preferred polysaccharide. By "cellulose" it is intended to mean any of the convenient and commercially available forms of cellulose such as wood pulp, cotton, hemp, ramie, or regenerated forms such as rayon. There exists no criticality as to the selection of a suitable form of cellulose. Cellulose is a naturally occurring polysaccharide consisting of $\beta(1\rightarrow 4)$ linked glucose units. In the native state, adjacent cellulose chains are extensively hydrogen bonded forming microcrystalline regions. These regions are interspersed by amorphous regions with less hydrogen bonding. Limited acid hydrolysis results in preferential loss of the amorphous regions and gives so-called microcrystalline cellulose. The cellulose useful in the present invention is either cellulose in the native state, or in the microcrystalline state. Also, cellulose derived from cotton linter is better than that derived from wood pulp, as the latter contains lignin.

Chemical reactions to attach the polymer to the polysaccharide material normally proceed with difficulty in crystalline regions but take place more readily in amorphous regions. For example, the substitution of functional groups into cellulose has a disruptive effect on the structure thereof. If carried out to completion, the cellulose matrix would be destroyed and ultimately water soluble polymers would be formed. Typical examples of the phenomenon are the hydroxyethyl cellulose and cellulose gums of the prior art, which becomes the commonly used adhesives and binders after dissolving in water.

Each anhydrous saccharide unit in a polysaccharide molecule may have three or more reactive hydroxy groups. Theoretically, all three or more can be substituted with the polymer. However, when the proper crosslinking reactions are controlled at these conditions, the attachment of polymer to the polysaccharide can be limited on the surface or near the surface of cellulose fibers.

The term "silica material" is meant to include any and all siliceous materials in particulate form commonly used as carrier materials. Typically, these materials have a specific surface area of 5 to 1500 $m^2/g$, a micropore diameter of 20 to 2000 A, and a particle diameter of $1\mu$ to 1 millimeter. Typical "silica material" includes, but is not limited to, silicate containing clay minerals including talc, kaolinite, pyrosmectite, montmorillonite, mica, and vermiculite; synthetic silicates such as silica gels, powders, porous glass and those prepared by hydrolysis of calcium silicide or sodium silicate; and biogenic silicas such as kieselguhr and diatomaceous earth. However, the silica material of the instant invention is characterized by surface hydroxy groups through which covalent coupling with the attached synthetic polymer is effected.

Also, synthetic particulate polymers bearing charges and/or reactive functional groups can be used to replace silica. Such particulates can be prepared by emulsion or suspension or dispersion polymerization technology, or from ground homopolymers or copolymers, or polymer blends, or polymer composites. Examples of such polymers include phenol formaldehyde or melamine formaldehyde particles.

The final structure of an ion exchange media of the invention thus comprises a polysaccharide chain covalently modified at a multiplicity of sites along such chain with the synthetic polymers and silica or particulate polymer covalently modified with the synthetic polymers.

The polymer which modifies the materials is either a homopolymer or a copolymer. The definition of the polymer as a homo- or copolymer depends on whether the polymerizable compounds (a) and (b) are different. In its most general form, the copolymer could be a random, a block or an alternating copolymer.

In one embodiment, the polymerizable compound (a) (also called "comonomer(a)") may have a group capable of reacting with the formation of a covalent bond. Such polymerizable compounds are defined for example in U.S. Pat. No. 4,070,348 to Kraemer et al, which is herein incorporated by reference. The chemical groups are capable of reacting with hydroxy groups at temperatures up to those at which the polysaccharide begins to decompose or depolymerize, e.g., 0° to 120° C., in aqueous solution and thereby form covalent bonds with the oxygen atoms of the hydroxy groups. Since water is always present in considerable excess with respect to the hydroxy groups, chemical groups which react spontaneously with water such as, for example, isocyanate groups, are less suitable. Aqueous solutions comprise pure water or mixtures of water with one or more water miscible cosolvents such as alcohols, ketones, and the like.

Typical hydroxy reactive groups of comonomer (a) are glycidyl acrylate and methacrylate; 4,5-epoxy-pentylacrylate; 4-(2,3-epoxy-propyl)-N-butyl-methacrylate; 9,10-epoxystearylacrylate; 4-(2,3-epoxypropyl)-cyclohexyl methacrylate; ethylene glycol-monoglycidyl etheracrylate; and allyl glycidyl ether. In the presence of an excess of epoxy functionality, reactive compounds can be added to the modified materials for further reaction. These compounds can be macromolecular or polymeric or oligomeric or monomeric in nature. These compounds should contain at least one of the reactive groups, i.e., carboxylic acid, primary amine, secondary amine, tertiary amine, hydroxyl and epoxy. If the reactive compound has more than one functional groups, additional linking reactions can be carried out.

The polymerizable comonomer (b) in order to serve as an ion exchange media, can contain any of the well known ionizable chemical groups or precursors thereof such as compounds containing a vinyl or vinylidene group and a carboxylic acid, a carboxylate salt, a carboxylate ester, preferably having 1 to 6 carbon atoms, a carboxylic acid amide, a secondary or a tertiary amine, a quaternary ammonium, a sulfonic acid, a sulfonic acid ester, a sulfonamide, a phosphoric or phosphonic acid, or a phosphoramide or phosphonamide group.

When comonomer (b) carries the precursor of a material having ion exchange properties, the ion exchangeable group itself can be obtained by unmasking, such as for example, by selective hydrolysis of an anhydride, ester or amide, or salt formation with an appropriate mono-, di- or trivalent alkaline or alkaline earth metal, as is otherwise well known in the art.

Preferred ion exchange functionalities for comonomer (b) are carboxymethyl, carboxyethyl, diethylaminoethyl, ecteola (mixed amines), or chelating groups such as $-N(CH_2-CO_2H)_2$ and $-N(CH_2COOH)-(CH_2)_2-N(CH_2COOH)_2$.

The preferred comonomer (a) for cation exchange materials is glycidyl methacrylate, coupled to the polysaccharide by previous oxidation thereof. The preferred comonomer (b) for cation exchange materials is methacrylic acid, acrylic acid and acrylic acid dimer, or glycidyl methacrylate further converted to a chelation group after copolymerization.

Other neutral comonomers (c) can also be added to the polymer, if desired. These comonomers may be polymerizable unsaturated compounds carrying neutral chemical groups such as hydroxy groups, amide groups, alkyl groups, aryl groups and the like. Preferred among comonomers (c) are $C_1-C_6$ alkyl acrylates or methacrylates, or the corresponding hydroxy alkyl acrylates or methacrylates. The function of comonomers (c) may be to increase the presence of hydrophobic or hydrophilic residues in the polymers, so as to provide a desired balance of hydrophilic and hydrophobic groups, if necessary.

The minimum ratio of comonomer (a) to total comonomer content is important. The synthetic polymer should have a sufficient amount of comonomer (a) to permit substantial covalent coupling of the polymer to the polysaccharide. If too little comonomer (a) is present in the polymer, then grafting becomes difficult, if not impossible. Generally, about 4-20, preferably 5-15% by weight of comonomer (a) relative to the total of (a) plus (b) (and (c), if any is present) is needed. Amounts of about 0.5 to 1 or 2% by weight appear to merely crosslink the polymer, without substantial grafting onto the polysaccharide.

The upper limit of comonomer (a) in the polymer can be varied up to 99.9% by weight, depending on the desired amount of rigidity, functionality and hydrophilicity. Increasing the amount of comonomer (a) too much above 15 to 20% by weight, however, decreases the porosity. Large molecules then have difficulty in gaining full access to the functional groups in comonomer (b). It is preferred to have a predominance of comonomers (b) over comonomers (a). Comonomers (c) may be present in an amount of up to 20 percent by weight of the total (a) plus (b) plus (c).

The weight ratio of polysaccharide and silica or particulate polymeric materials to the modifying polymer is freely adjustable, and varies from 0.1 to 5 weight part of copolymer to parts by weight of the total material.

When comonomers (b) carry ionizable chemical groups capable of providing cation exchange capacity it is found that unless some degree of crosslinking is provided, the flexibility of the material in solution tends to favor the formation of micelle-type aggregates and slow loss of capacity. Therefore, it is a preferred mode of the invention to provide either by incorporating into the polymerization recipe a small amount of polyunsaturated comonomer having at least two polymerizable alpha, beta-carbon double bonds, such as for example mono and polyethylene glycol dimethacrylates and diacrylates (with the polyethylene glycol residue containing up to 6 ethylene groups), ethylene dimethacrylate, ethylene diacrylate, tetramethylene dimethacrylate, tetraethylene diacrylate, divinylbenzene, triallyl cyanurate, methylene-bis-acrylamide or -bis-methacrylamide, and the like.

The amount of crosslinking agent is best determined empirically. It is considered sufficient when the polymer preserves the ion exchange capacity at a constant value over time and would be considered too high if swelling is prevented and too much rigidity is obtained in the final materials. Ideally, an amount of crosslinking agent between zero up to 10 mole percent of the synthetic polymer units is used.

The carrier materials of the present invention can be used per se in the same manner as other carrier materials of the prior art. Alternatively, and in a preferred mode, the material, which is preferably substantially fibrous in form after the modification, can be formed into a self-supporting fibrous matrix, such as a fibrous sheet, with ion exchange properties. The modified fibrous media can also incorporate unmodified fibers of various different sizes, and, in addition, can also incorporate modified or unmodified particulate material.

In the preferred form, the media of this invention comprises a porous matrix of fiber containing silica or particulate polymer wherein the fiber and silica or polymer are effective for ionic separations. The matrix is substantially homogeneous with respect to each component. The overall media is substantially inert and dimensionally stable.

When particulate is included in the media, the preferred particulates which can be used include all of those substances which can be provided in finely divided form and exhibit ion-exchange functionality, i.e., capable of effective ion separations and/or reactions. Mixtures of such compositions may also be utilized. Exemplary of such particulates are silica, alumina, zirconium oxide, diatomaceous earth, perlite, clays such as vermiculite, carbon such as activated carbon, modified polymer particulates such as other ion exchange resins, crystalline cellulose, molecular sieves, and the like, the surfaces of which may be modified in a conventional manner. Such materials are commercially available under a variety of trademarks such as BIOSILA, HI-FLOSIL, LI CHROPREP SI, MICROPAK SI, NUCLEOSIL, PARTISIL, PORASIL, SPHEROSIL, ZORBAX CIL, CORASIL, PALLOSIL, ZIPAX, BONDAPAK, LICHROSORB, HYPERSIL, ZORBAX, PERISORB, FRACTOSIL, CORNING POROUS GLASS, DOWEX, AMBERLITE resins, and the like.

Examples of references which describe particulates effective for molecular separations, which may also be included, are Miller, U.S. Pat. No. 3,669,841; Kirkland et al, U.S. Pat. No. 3,722,181; Kirkland et al, U.S. Pat. No. 3,795,313; Regnier, U.S. Pat. No. 3,983,299; Chang, U.S. Pat. No. 4,029,583; Stehl, U.S. Pat. No. 3,664,967; Krekeler, U.S. Pat. No. 4,053,565; and Iher, U.S. Pat. No. 4,105,426. The entire disclosure of all of these references are incorporated by reference.

The particle size of the particulate included in the media influences the flow rate at which the sample to be treated passes through the material. Usually, uniform particle sizes greater than about 5 microns are preferred, with about 10-600 microns constituting a practical operational range. The amount of the particulate can vary widely from about 10% wt. up to 80% wt. or more of the solid phase. The optimum particulate concentration and particle size will vary depending on the ion-exchange and filtration efficiency, and flow rate desired.

Normally, larger particles provide faster flow rates, and lower ion exchange and filtration efficiencies.

The fibrous matrix of the media should be capable of immobilizing the particulate contained therein, i.e., capable of preventing significant particulate loss from the stationary phase, yet having a porosity which enables the fluid to pass through the media. Thus, although the modified polysaccharide materials, e.g. cellulose, of the present invention are selfbonding and the addition of extra fibers or binders may not be necessary, it is possible to utilize such extra fibers or binders. Other fibers usable for the media include polyacrylonitrile fibers, nylon fibers, wool fibers, rayon fibers and polyvinyl chloride fibers, other cellulose fibers such as wood pulp and cotton, and cellulose acetate.

One embodiment of the invention is the provision of a fibrous media which includes two different types of celluloses: one the modified cellulose prepared in accordance with the invention and another an unmodified cellulose. An unrefined structural fiber ma be used to assist in providing sheets of sufficient structural integrity in both the wet "as formed" condition, and in the final dry condition, allows handling during processing and during the intended end use. Such fibers are typically relatively large, with commercially available diameters in the range of 6 to 60 micrometers. Wood pulp can also be used and has fiber diameters ranging from 15 to 25 micrometers, and fiber lengths of about 0.85 to about 6.5 mm. The unrefined self-bonding fibers typically have a Canadian Standard Freeness of +400 to +800 ml. These long self-bonding fibers may constitute greater than 5% of the fibrous media, by weight, preferably 6–50% of the fibrous media, and most preferably 20%. Optionally, a minor portion of cellulose pulp which has been refined to a Canadian Standard Freeness of between +200 and −600 ml may be incorporated with a major portion of the normally dimensioned cellulose pulp (+400 to +800 ml). In particular, from about 1 to 10% of the refined pulp and about 5% to about 50% of the unrefined cellulose may be contained in the matrix. Particulates may also be added. The addition of particulate material tends to increase the rigidity and strength of the media and render it readily useful for industrial applications, especially those involving high pressure.

In another embodiment, it is possible to derivatize additional siliceous particles with silanes and attach thereto various ion exchange or anchoring groups. In this embodiment then, both the cellulosic fiber silica media and the additional derivatized siliceous particulate interact providing increased ion exchange capacity.

Process of Preparation

In order to perform a "one pot" reaction in water containing both polysaccharide and silica (the preferred media), it is necessary to pretreat the silica because the surface modification in water of a polysaccharide is easier than for silica.

A cationic polymer can be adsorbed on to the surface of silica because the silica surface is negatively charged. Therefore, it is easy to carry a "one pot" reaction to modify polysaccharide and silica simultaneously, in the presence of cationic polymers such as poly (diethylamino ethyl methacrylate), i.e. in the presence of comonomer (a).

However, it is difficult to link anionic comonomer (b) directly onto the surface of silica even in the presence of comonomer (a), due to silica's negatively charged surfaces. One method to overcome this problem is to convert the anionic surface charge of the silica to a positive or a neutral charge. This can be achieved by treating the silica with a suitable amount of a cationic polymer or cationic polyelectrolyte having such functional groups as protonated amines, quaternary ammonium, phosphonium, or sulfonium. Preferred cationic polyelectrolytes are polyamido-polyamine-epichlorohydrin or polydiallylmethylamine-epichlorohydrin, due to the fact that these types of polyelectrolytes can be heat cured at elevated temperatures. This is an advantage over other non-crosslinkable or non-reactive cationic polyelectrolytes, because such curing of the cationic polyelectrolytes fix the polymer on the surface of silica and therefore reduce leaching problems.

The polymer-modified materials of the invention can be prepared in various modes. Generally speaking, in one mode, one can first prepare the polymer and then condense the same through its hydroxy reacting groups (if available) to the polysaccharide and silica materials. Alternatively, in another mode, one can first react the materials with an hydroxy group-reactive comonomer (a) followed by copolymerization with comonomer (b) and any other comonomers (e.g., crosslinking comonomers, hydrophobic comonomers, etc.), as desired. These reactions are therefore of two types: (1) coupling of saccharide and silica to hydroxy reactive groups on comonomer (a), and (2) polymerization of polymerizable unsaturated compounds. The order in which these are carried out is not particularly critical.

A method of (indirectly) attaching the synthetic polymer to the polysaccharide component involves previous chemical activation of the polysaccharide. For example, polysaccharide can be treated with oxidizing agents such as periodate, hydrogen peroxide, ceric or other metallic oxidizing ions or the like. Reaction of the activated polysaccharide with an amino-containing polymerizable monomeric compound followed by reduction, will normally yield derivatized polysaccharide-carrying unsaturated functionalities along the chain thereof. These unsaturated functionalities can then serve as further attachment positions for conjugating the polymer thereto.

Another type of chemical activation of the polysaccharide involves reaction with a compound such as a diepoxide or epichlorohydrin, which yields a derivatized polysaccharide-carrying epoxy or other groups along the chain thereof. These epoxy or other groups then serve as conjugating positions on the polysaccharide chains.

The chemical activation modes of (indirect) attachment of the polymer to polysaccharide are particularly useful when introducing negative (anionic) functionalities into the polymer This is due to the fact that graft polymerization, which is a common way of conferring positive charge to polysaccharides such as cellulose, is not very effective when attempting to confer negative charges (present in carboxy, phosphoric, sulphonic groups, etc.) thereto.

Polymerization of comonomers can be carried out by free radical chain polymerization, step-reaction polymerization, ionic polymerization or coordination polymerization. Particularly useful is free radical polymerization.

The free radical addition polymerization of radical polymerizable comonomers is accomplished by using the well known steps of initiation, addition and termination. This procedure utilizes a compound which produces radicals capable of reacting with the monomers. Probably the simplest of all polymerization initiators are the organic peroxides and azo compounds. These substances decompose spontaneously into free radicals in common organic solvents at a finite rate, at temperatures between 50° and 140° C. For example, benzoyl peroxide decomposes into two benzoyloxy radical at 60° C. Another example is afforded by the azo compound azo-bisisobutyronitrile which similarly decomposes into radicals at moderate temperatures.

The necessary energy may also be provided by irradiating the initiator system with ultraviolet light. For example, initiation can be provided by irradiating the initiator system in the presence of photo initiators such as benzophenone and its derivatives, benzoin alkyl ethers or derivatives, or acetophenone, with ultraviolet light. It is then necessary that the initiator molecules adsorb in the spectral region supplied. In this way radicals can be generated at a finite rate at considerably lower temperatures than are necessary if purely thermal excitation is used. Finally, bimolecular reactions may produce radicals capable of initiating polymerization. Particularly important are the redox reactions which occur in aqueous media and involve electron transfer processes. For example, the Fe(II) plus hydrogen peroxide systems, or Ag(I), plus $S_2O_8$ system—are particularly important in initiating the radical polymerization of monomers. Because of the low temperature of initiation, the redox initiators or photochemically induced initiations are particularly preferred in the present invention. The amount of initiator is that sufficient to initiate the polymerization reaction. Polymerization is carried out until substantially all of the monomers or comonomers have been incorporated into the polymeric chains. This can be readily ascertained by simple analytical tests on the reaction mixture. Preferably, this polymerization accomplished almost simultaneously with or immediately prior to the covalent coupling of the polymer to the materials. Preferably, the coupling and polymerization are performed in the same aqueous phase.

In one embodiment, the condensation of the comonomer (a) with the hydroxy groups or groups of polysaccharide and silica, whether carried out before polymerization or thereafter, is normally carried out by adjusting the temperature of the reaction mixture, or by adding an appropriate acid/base catalyst.

The most preferred method of carrying out the process of this invention is in a "one pot" system, using an hydroxy reactive comonomer (a). The desired comonomers and polysaccharide and silica are added to an inert solvent system, such as, e.g., water, organics, and the like. The polysaccharide, silica and comonomers are treated under conditions which will initiate polymerization of the comonomers. This can be accomplished, for example, by adding to a well stirred mixture of a water solution of an initiator such as ammonium persulfate and sodium thiosulfate, and initiating polymerization from about 15° C. to 80° C. Alternatively, a photoliabile initiator can be added and initiation caused by photochemical means. After stirring for a time sufficient to allow the polymerization to proceed to completion, the linking of the formed copolymer to the hydroxy groups of the polysaccharide and silica is caused by increasing the temperature of the reaction mixture to a temperature sufficient to cause this condensation. In the case when the linking group on the copolymer is a glycidyl group, such temperature is normally around 80°–100° C. Reaction is then allowed to proceed at the second temperature for a time sufficient to either go to completion, or to achieve modification of the materials to the desired capacity. The product is filtered, washed and dried for further treatment, if necessary. Unreacted monomer is preferably washed away with water or alcohol, unreacted catalyst with aqueous media and polymer with methanol or ethanol.

An illustrative example of the formation of a product under this invention is a composite of (1) cellulose, (2) silica, (3) a copolymer of (a) glycidyl methacrylate (GMA), (b) methacrylic acid (MA) and diethylaminoethyl methacrylate (DEAEMA), (c) divinylbenzene (DVB), which will be used only to show the many variables which are involved in the preparation, and which can be controlled to achieve a virtually unlimited number of products and resulting properties.

Dispersion and Addition of Charge Modifier

Step 1: Silica Dispersion and Addition of Charge Modifier

Silica is dispersed in water along with charge modifier.

Variables (A) Silica size and surface characteristics
(B) Concentration of charge modifier
(C) Chemical nature and physical property of charge modifier
(D) pH of water
(E) Concentration of electrolyte
(F) Time for dispersing
(G) Dispersing temperature
(H) Rate of stirring
(I) Percent solid content Step 2: Addition of Cellulose Fiber Temperature is raised to 10° C. to 95° C., for 1 to 60 minutes.

Variables (A) Chemical nature and physical size of cellulose
(B) Temperature
(C) Speed of stirring
(D) Time of stirring
(E) pH of water
(F) Concentration of electrolyte
(G) Adjustment of charge modifier, if necessary
(I) Cellulose/silica ratio Steps 1 and 2 can be combined into one step by adding cellulose, silica and charge modifier together.

Step 3: Addition of MA, GMA, DEAEMA and DVB Monomers

Variables (A) Purity of monomers
(B) Percent solid content
(C) Monomer/cellulose ratio
(D) Monomer/silica ratio
(E) MA/GMA ratio
(F) MA/DEAEMA ratio
(G) MA/DVB ratio
(H) Sequence, rate and mode of monomer additions
(I) Temperature
(J) Speed of stirring
(K) pH of slurry Step 4: Addition of Catalysts Variables (A) Amount of catalysts
(B) Purity of catalysts
(C) Temperature at addition
(D) Rate of addition(s)
(E) Time of mixing
(F) pH of slurry
(G) Speed of stirring Step 5: Polymerization and Linking Reaction to Cellulose The polymerization normally maintained between 80°–95° C.

Variables (A) Temperature at reaction
(B) Heating or cooling rate of the reaction
(C) Speed of stirring
(D) pH of slurry Step 6: ph Adjustment and Wash (I)

The slurry was neutralized and washed with water.

Variables (A) Amount and type of base need to adjust the slurry to the
desired pH.
(B) Volume of water
(C) Concentration of electrolyte Step 7: Wash (II)

Wash with water.

Variables (A) pH of the wash water
(B) Numbers of washes
(C) pH and electrolyte of wash water A self-supporting matrix using the modified polysaccharide and silica or particulate polymer of the invention can preferably be made by vacuum felting or filtering an aqueous slurry of fibers and silica or particulate polymer and, if desired, additional resins and modified or unmodified particulate. This forms a sheet having uniformly high porosity, fine pore-size structure with excellent flow characteristics and is substantially homogeneous with respect to fiber, resins and particulate.

The vacuum filtering or felting is performed on a foraminous surface, normally a woven wire mesh, which in practice may vary from 50 mesh to 200 mesh, with mesh openings ranging from 280 micrometers to 70 micrometers respectively.

The sequence of adding the overall components to the slurry (modified fibers, other fibers, particulates, modified particulates, other resins, etc.) is relatively unimportant, provided that the slurry is subjected to controlled hydrodynamic shear forces during mixing process. The slurry is diluted with water with a proper consistency required for vacuum filtering and sheet formation. This latter consistency will vary depending upon the type of equipment used to form the sheet. Typically, the slurry is cast onto a foraminous surface, vacuum filtered and dried in the conventional manner.

The flat, dimensionally stable sheet can be of any desired thickness and is then cut to the appropriate dimensions for each type of application. Preferably the wet sheet is often dried and then cut to proper size in order to form discs. These discs can be loaded onto an appropriately sized cylindrical column to form the desired medium. The discs and cylinder should preferably be in interference fit so that the disc can be pushed into the cylinder without distortion, but not fall under gravitational force allowing gaps between the discs and the cylinder. After the column is packed dry, a pump can be used to pump solvent through the elements stacked in the column. Preferably, the elements swell to form a substantially tight edge seal to the cylinder wall. Because the individual elements are dimensionally stable, the column is not sensitive to orientation or handling, a problem which is common with other chromatographic media, particularly of any gel type media. Other configurations may be utilized, i.e. cartridges, capsules, etc.; see, for example, copending application U.S. Ser. No. 07/422,519 filed Oct. 17, 1989 entitled "Filter Device" to Giordano, et al, the entire disclosure of which is incorporated herein by reference.

A media formed from modified polysaccharide and modified silica or particulate polymer, modified or unmodified particulate and unmodified fibers is advantageous because of the potential to adjust, as conditions dictate, swelling, rigidity and capacity by varying the many variables present in the system. Flow rates can be controlled by varying the ratio of polysaccharide to particulate (especially silica) components without significant loss of capacity. In addition, such a system shows advantages over prior art systems using non-modified celluloses in that, in many instances, no refined pulp is necessary, since the polymer linked on the polysaccharide will function as well as refined pulp in bridging particles to the fiber surfaces. The polymeric components in the present system may also function as binder resins; therefore, addition of resins to the slurry can, if desired, be eliminated.

While ordinarily the prior art has relied on materials with high surface area to bind the maximum number of chemical groups thereon, the materials of the present invention provide means of binding multi-functional groups per each polysaccharide molecule or on the silica or particulate polymer. As long as these functional groups are made accessible for ion exchange or anchoring, the preparation is no longer limited to high surface area materials.

Retention of additional fine, heavy metal ion-exchange particulate in the media may be enhanced by the selective utilization of cellulose pulp at a Canadian Standard Freeness of between about +800 and −1000 ml. This combination with cellulose pulp permits the retention of fine ion-exchange or ion-chelating materials ranging from 10 to 99 percent by weight of the media. The media sheet formed by vacuum felting of an aqueous slurry of cellulose fibers and fine ion-exchange or ion-chelating particulates, and ion-exchange cellulose fibers and silica shows a uniform, high porosity, and fine pore size structure with excellent ion-exchange and flow characteristics.

In order to achieve significant increases in retention of fines during vacuum felting of the media sheet, only small amounts of the highly refined pulp need to be added to the fiber-fine slurry. As little as one percent by weight of the total refined pulp produces significant increases in retention. The more highly refined the pulp is, the smaller the amount that is required to achieve a given level of improvement in retention. Diminishing increments of improvement in retention are noted as the amount of refined pulp is increased and the degree of refining is extended into higher inverted Canadian Freeness values. In practice, there appears to be little advantage in using more than 10 percent by weight of the highly refined pulp, or of using refined pulps exhibiting inverted Canadian Freeness values greater than −600 ml.

There are several types of pulp refiners commercially available and these fall into two basic categories, namely, conical or jordan types, and disc types. The disc types, especially double-disc refiners, appear to be particularly suitable for the preparation of highly refined pulps.

The standard grade of wood pulp (hereinafter "unrefined") may comprise as little as 0 percent by weight with up to 90 percent by weight of the total, being preferred to provide media sheet with structural characteristics suitable for ion-exchange and filtration application.

The amount of wood pulp used in the media is dependent on the required capacity, the swelling of the ion-exchange materials, the desired flow rate, and the desired efficiency. If the swelling of the ion-exchange is low, the amount of wood pulp can be reduced to zero percentage, to maximize the capacity and efficiency. When the ion-exchange material exhibits high swelling and low flowing rate characteristics, more wood pulp will be used, usually in the range of 10 to 70 percent and up to 90 percent.

There are various types of fine ion-exchange or ion-chelating materials that are suitable for use with the media of this invention, including cation exchangers, anion exchangers, selective ion exchangers and mixtures of the above. The cation exchange materials include inorganic cation exchange materials such as modified carbon black, synthetic aluminosilicate gels, and molecular sieves; natural organic cation exchangers, such as carbonaceous ion-exchanger; synthetic organic cation exchangers such as sulfonic acid, $-SO_3H$ (for example, Dow Chemical Company, Dowex-b 50W, and Rohm and Haas Company, Amberlite IRA-118H), carboxylic acid, $-COOH$ (for example, Rohm and Haas Company Amberlite IRC—50), thiol, $-SH$ (Rohm and Haas Company Duolite GT-3), and phosphonic acid.

The synthetic organic cation exchangers can be in their acid form or in salt form such as sodium, potassium, calcium forms, etc., depending on their application, for example, potassium carboxylate from ($-COOK$, Rohm and Haas Company Amberlite IRP-88) has higher capacity than the carboxylic acid from ($-COOH$, Rohm and Haas Company Amberlite IRC-50) in alkaline earth and heavy metal ion removal. Ion-chelating or selective ion-exchange resins containing sodium iminodiacetic groups, ($-N(CH_2-COONa)_2$, Dow Chemical Company Dowex-A-1, and Rohm and Haas Company Amberlite IRC-718), can also be used in conjunction with the media of this invention to formulate ion-exchange filter sheets. Usually, the backbone or so-called polymeric matrix of the synthetic organic ion-exchange materials are crosslinked polymers of polystyrene, or polyacrylated, or polymethacrylates or polyacrylamide. The ion-exchange or chelating functional groups are situated on those polymer chains.

There are four types of ion-exchange resins available depending on the structure of the polymer matrix. They are gel, macroreticular, macroporous, and isoporous types. All of the above four types are suitable for use in conjunction with the media of this inveniton for use in filter sheet formation. Mechanical grinders, blenders or fiber refiners may be used to break ion-exchange resin down to −400 mesh. Alternatively, fine ion-exchange materials can be prepared with suspension or dispersion or emulsion polymerization technology.

Synthetic ion-exchange fibers made from bicomponent polymers, both woven and non-woven, which are relatively new on the market, may also be utilzed. These ion-exchange fibers comprise an inert polymer fiber core covered or linked with an ion-exchange outer sheath. The characteristics of these fibers enables the vacuum felting of these fibers with other fiber(s) and/or particulates to form ion-exchange pads as described above.

There are also various types of fillers that can be blended into the media slurry. The fillers include colloidal silica, precipitated silica, fused silica, carbon charcoal, synthetic fibers, glass fiber, and polymeric particulates. The synthetic fibers, for this application, should have hydrophilic surfaces and are preferred to have either anionic or cationic charges. The polymeric particulates can be ground powder of polymer blends or composites. Spherical particulates can be produced by emulsion or suspension or dispersion polymerization technology.

In addition to controlling the dispersion characteristics (and therefore the porosity of the sheet), wet strength agents (binder) may be employed to control the toughness of the sheet constituents and maximize performance and the ion-exchange efficiency under high flow conditions. In practice, cationic binders are employed since all cation-exchange materials are anionic in nature. Such cationic binders may be cationic polyelectrolytes, containing such functional groups as protonated amines, quaternary ammonium, phosphonium, or sulfonium (for a general survey, see M. F. Hoover, "Cationic Quaternary Polyelectrolytes—A Literature Review", J. Macromol, Science Chemical, 4, #6, pp. 1327–1417, (1970).

The specific choice of binder depends upon many factors including cost, fluid and temperature compatibility, toxicology and supplementary functional attributes such as crosslinking characteristics with cellulose and particulate surfaces, in addition to the primary filtration performance factors. Selection of suitable cationic binders from the broad categories specified above may be easily accomplished by methods well-known to the art. Thus, a 0.2 percentage level is appropriate for polyamide-polyamine-epichlorohydrin or polydiallyl-methylamine-epichlorohydrin resins. Although additional modifier may be employed to advantage where desired, these levels represent the best balance for these materials on a cost/performance basis.

The media of this invention may be used to remove heavy metal ions such as lead, zinc, copper, cadmium, nickel or aluminum.

Having now generally described this invention, the same will be better understood by reference to certain specific examples which are included for purposes of illustration only, and are not intended to be limiting of the invention unless otherwise specified.

EXAMPLE 1

Poly (methacrylic acid) -g-cellulose/silica

A. Recipe

| Reagent | Quantity |
| --- | --- |
| Cellulose Fiber (+120 CSF) | 5.0 g |
| Silica, Davidson Grade 11 | 12.0 g |
| Charge Modifier, Hercules 1884 | 0.6 ml |
| Methacrylic Acid | 22.0 ml |
| Diethylamino ethyl methacrylate | 2.0 ml |
| Glycidyl methacrylate | 2.5 ml |
| Divinyl benzene | 0.3 ml |
| Ammonium Persulfate | 0.5 g |
| Sodium Thiosulfate | 0.5 g |
| Water | 300. ml |

B. Procedure

1. Silica was well dispersed in water in a reactor.
2. Charge modifier was added into the reactor, stirred for 20 minutes while being heated to 40° C.
3. Cellulose was added and well dispersed.
4. Add methacrylic acid, divinyl benzene, diethylaminoethyl methacrylate and glycidyl methacrylate. Then the slurry was stirred for 20 minutes and purged with nitrogen.
5. Then 20 ml of ammonium persulfate and sodium thiosulfate solutions were added into the reactor.
6. The slurry was stirred and heated to 80°–90° C. for 2 hours.
7. Then the slurry was neutralized with KOH to pH 8.0, filtered and washed.

C. Results

The number of available methacrylic acid-potassium salt groups was determined by titrating with 0.1N hydrochloric acid on a Brinkman Potentiograph E536. The titratable carboxylic acid-K salt is 2.5–3.0 meq/g.

The capacity results were further checked by measuring lead capacity. In a 100 ml of 1000 ppm lead (nitrate) solution at pH 4, 0.15 g of dried media was stirred for 2 hours. The equilibrium pH increased to 4.6–4.8. The filtrate was analyzed with a Perkin-Elmer 305B Atomic Absorption Spectrophotometer. The instrument was calibrated with standard lead nitrate solution before analysis. The calculated lead capacity was in the range of 250–300 mg/g media.

EXAMPLE 2

Iminodiacetic Acid Modified Cellulose/Silica

B. Recipe

| Reagent | Quantity |
| --- | --- |
| Cellulose Fiber (+120 CSF) | 5.0 g |
| Silica, Davidson Grade 11 | 12.0 g |
| Charge Modified, Hercules R4308 | 0.4 ml |
| Ethoquad, Alcolac | 0.8 ml |
| Glycidyl Methacrylate | 10. ml |
| Ammonium Persulfate | 0.5 g in 10 ml H$_2$O |
| Sodium Thiosulfate | 0.5 g in 10 ml H$_2$O |
| Iminodiacetic acid | 30 g in 100 ml H$_2$O |
| 6M NaOH | |
| Water | 300. ml |

B. Procedure

1. Silica was dispersed in water in a reactor.
2. Charge modifier was added into the reactor and stirred for 20 minutes while being heated to 40° C.
3. Cellulose and Ethoquad were added and well dispersed, purged with N$_2$ for 20 minutes.
4. Glycidyl methacrylate was added.
5. Ammonium persulfate and sodium thiosulfate solutions were added.
6. Heat reactor to 80° C. for 30 minutes.
7. Add iminodiacetic acid-Na Salt pH 10 solution into reactor.
8. Maintain pH at 9.0 to 9.5 range with NaOH solution at 80° C. for 10 hours.
9. Wash slurry with distilled water.

C. Results

The number of acidic functional groups was determined by titrating the acid and water washed media with 0.0N NaOH solution. The acid group is 1.6 meq/g.

The media was further checked by measuring zinc capacity. In a 100ml of pH 4, 200 ppm zinc (nitrate) solution, 0.15 g of dried media was stirred for two hours. The equilibrium pH was adjusted to 4.5. The Zn remained in the filtrate was determined with atomic absorption spectrophotometer. The capacities of the media for Zinc was 52.3 mg/g-media.

EXAMPLE 3

Ethylene diamine tetraacetic acid-modified chelation Media

A. Recipe

| Reagent | Quantity |
| --- | --- |
| Cellulose Fiber (+120 CSF) | 5.0 g |
| Silica, Davidson Grade 11 | 12.0 g |
| Charge Modifier, Hercules R4308 | 0.5 ml |
| Ethoquad, Alcolac | 0.8 ml |
| Glycidyl Methacrylate | 10. ml |
| Ammonium Persulfate | 0.5 g in 10 ml H$_2$O |
| Sodium Thiosulfate | 0.5 g in 10 ml H$_2$O |
| 1,6-Hexanediamine | 25 g |
| Ethylenediamine Tetraacetic Acid | 4.5 g |
| N-Ethoxycarbonyl-2-ethoxy-1,2-dihydroquinoline (EEDQ) | 5.9 g |
| Water | 400 ml |
| Absolute Ethanol | 400 ml |

B. Procedure

1. Silica and charge modifier was stirred in water while being heated to 40° C.
2. Cellulose and Ethoquad were added and well dispersed.
3. Reactor was purged with nitrogen 20 minutes at 40° C.
4. Glycidyl methacrylate was added.
5. Ammonium persulfate and sodium thiosulfate solutions were added.
6. Heat reactor to 80° C. for 30 minutes.
7. 1,6-Hexanediamine was added and stirred at 90° C. for 10 hours.
8. The slurry was cooled and washed with water.
9. Add the cleaned media to a clean reactor with 400 ml of water.
10. Then ethylene diamine tetraacetic acid, followed by N-ethoxycarbonyl-2-ethoxy-1,2-dihydroquino line in 400 ml of absolute ethanol were added, and stirred at room temperature for 48 hours.

11. The slurry was washed with 40% ethanol and water several times.

C. Results

The number of acidic functional groups was determined
by titrating the acid-$H_2O$ washed media with 0.1N NaOH solution. The total acidic groups is 2.6 meq/g. The capacities of copper, lead, zinc and cadmium at pH 4.5 were 55.0, 179, 57.2, and 96 mg/g-media respectively.

EXAMPLE 4

Formation of Ion-Exchange Filter Sheets

Ion-exchange filter sheets were formulated with the methacrylic acid modified cellulose and silica of Example 1. In a 2% aqueous slurry the media was blended with unrefined cellulose, refined cellulose (−240 CFS) in the presence of 20 ml of R4308 resin (Hercules). The vacuum felted 28 in.×28 in., 500 gram pads were dried at 150° C.

The formulation, flow rate and pressure are listed in the following Table 1.

TABLE 1

| Pad No. | Media of Example 1 Wt. % | Unrefined Cellulose Wt. % | Refined Cellulose −240 CFS | P, PSI 4 Pads, 570 ml/min in 1½ in column |
|---|---|---|---|---|
| 28 | 80 | 20.0 | 0 | 2.3 |
| 34 | 80 | 19.7 | 0.3 | 5.2 |
| 36 | 80 | 19.3 | 0.7 | 8.5 |
| 29 | 80 | 19.0 | 1.0 | 10.0 |
| 30 | 80 | 18.0 | 2.0 | 21.5 |

EXAMPLE 5

Separation of Heavy Metal Ion Mixtures with Methacrylic acid-K salt Filter

In this example, it is demonstrated that —COO—K+ filter pads, like columns, can be utilized to selectively separate heavy metal ion mixtures with a high degree of resolution. The pads have no undesirable pressure problems and can therefore be operated at a high flow rate with a low pressure drop.

Figure 5:
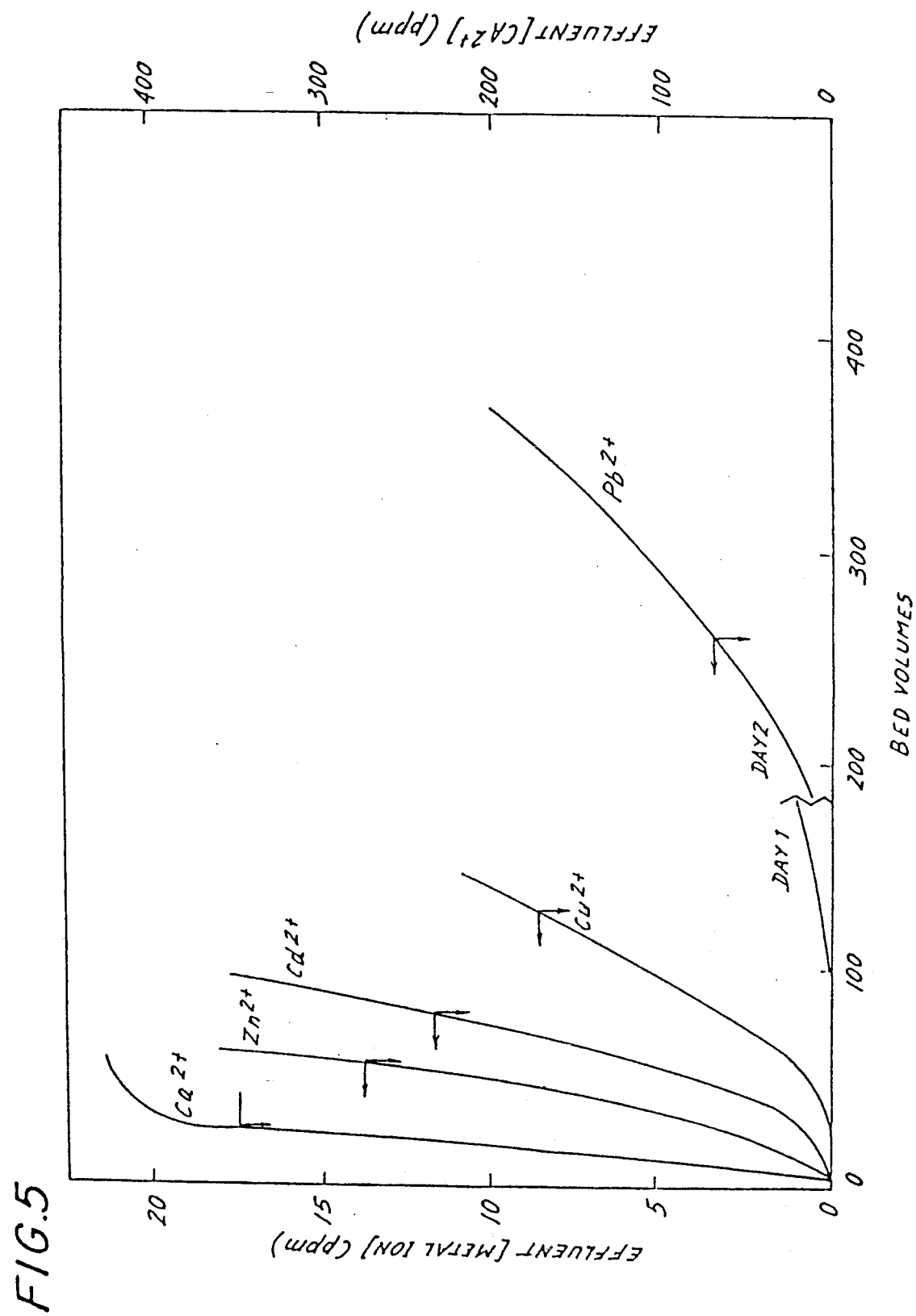
FIG. 5 is a graph depicting the selectivity between heavy metal cations for —COO—K+ media.

Column: 1.0 inch in diameter, 1.78 gram of —COO—K+ media
Flow rate and Pressure: 8.8 ml/min, 2 psi
Influent: pH 4.0 solution of 19 ppm of lead, 20 ppm of copper, 20 ppm of cadmium, 20 ppm of zinc, and 395 ppm of calcium, all in nitrate form. Five pads were used.
FIG. 5 shows the sequence of breakthrough of each ion.

| Results: | | |
|---|---|---|
| | Breakthrough Volume at 1 ppm ion Bed Volume (ml) | Capacity of ion at 1 ppm breakthrough (mg/g) |
| Lead | 168 | 30 |
| Copper | 62 | 12 |
| Cadmium | 25 | 4.8 |
| Zinc | 12 | 2.3 |
| Calcium | ~2 | — |

EXAMPLE 6

Separation of Heavy Metal Ion Mixtures with Iminodiacetic Acid Modified Filter This example demonstrated that the iminodiacetic acid functionality provided high selectivity of copper over all other ions.

Figure 6:
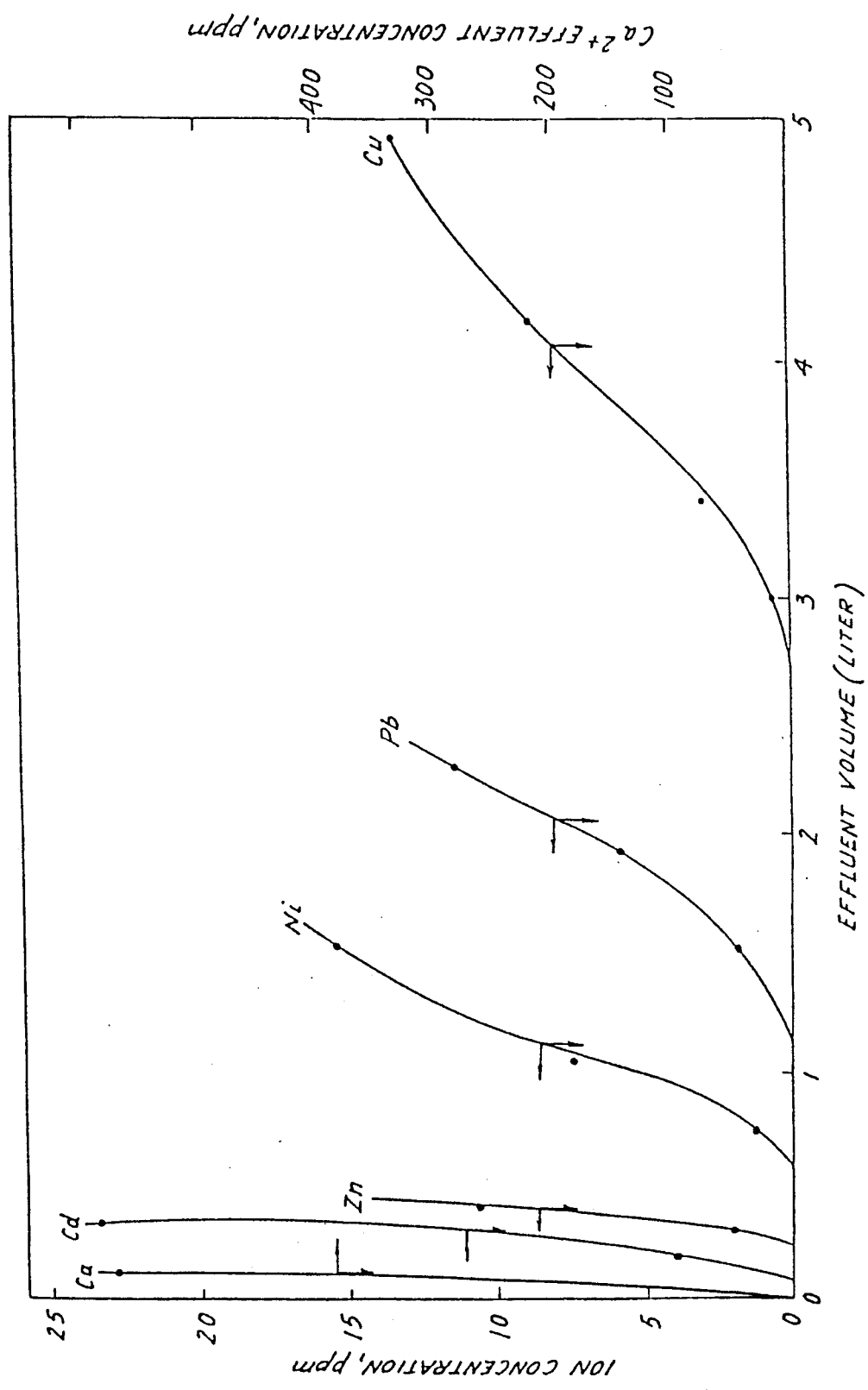
FIG. 6 is a graph depicting the separation of a heavy metal ion mixture with iminodiacetic acid modified media.

Column: 1.0 inch in diameter 1.53 g of iminodiacetic acid modified media.
Flow Rate and Pressure: 10.0 ml/min at 1 psi.
Influent: pH 4.0 solution of 20 ppm of lead, 20 ppm of copper, 20 ppm of zinc, 20 ppm of cadmium, 200 ppm of nickel and 200 ppm of calcium, all in nitrate form.
Results: The selectivity of copper is apparently much higher than the rest of the ions. (FIG. 6):

| | Breakthrough Volume at 1 ppm ion (ml) | Capacity of Ion at 1 ppm breakthrough (mg/g) |
|---|---|---|
| Copper | 3150 | 41 |
| Lead | 1400 | 18 |
| Nickel | 750 | 9.8 |
| Zinc | 300 | 3.9 |
| Cadmium | 125 | 1.6 |

EXAMPLE 7

Efficiency of Lead Removal from Meriden City Water (Connecticut)

The Meriden City water has the following characteristics:

TABLE 1

| Test | Units | Test Results |
|---|---|---|
| pH | pH | 7.47 |
| TDS | PPM | 194 |
| Turbidity | NTU | 0.50 |
| Total Hardness: | PPM | 150 |
| Iron | PPM | 0.00 |
| Manganese (Mn) | PPM | 0.00 |
| Copper (Cu) | PPM | 0.10 |
| Tannin | PPM | 0.10 |
| Alkalinity: Bicarbonate ($HCO_3$) | PPM | 40.00 |
| Chloride (Cu) | PPM | 45.00 |
| Sulfate ($SO_4$) | PPM | 3.00 |
| Calcium (Ca) | PPM | 55 |
| Magnesium (Mg) | PPM | 10.50 |
| Sodium (Na) | PPM | 18.00 |
| Potassium (K) | PPM | 1.46 |
| Silica ($SiO_2$) | PPM | 16.00 |

The water was acidified with HCl to pH 5.8 and then the proper amount of lead nitrate solution (pH 4) was added to make 170 ppb lead concentration.

Then the pH of the solution was raised to 6.0 with KOH solution.

Figure 7:
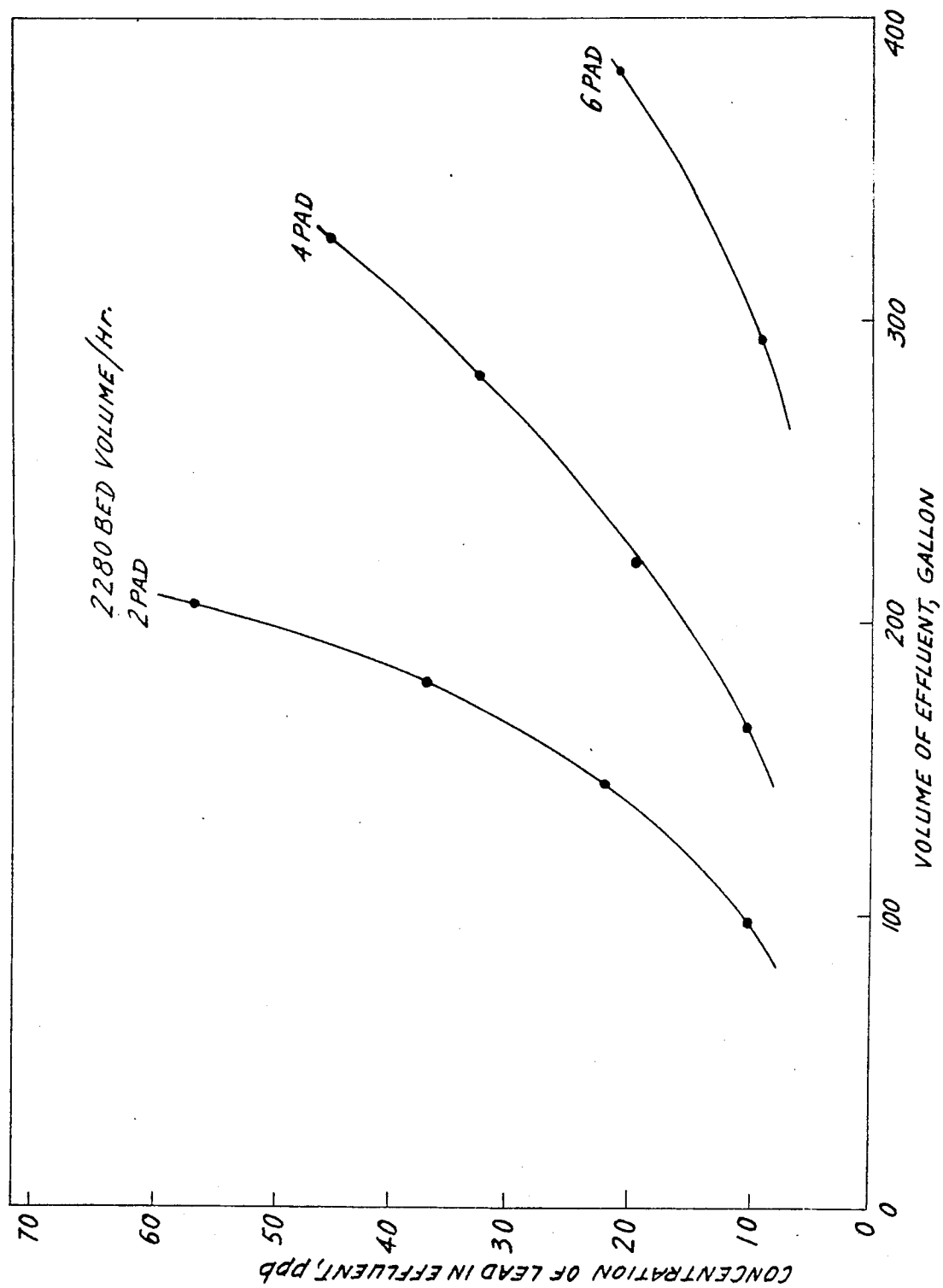
FIG. 7 is a graph depicting lead reduction of "spiked" water with various amounts of methacrylic acid-modified media.

Three columns with 1.5 inch diameter packed with 2, 4 and 6 pads of —COO—K+ disks weighed 3.0, 6.0, and 9.0 grams respectively, were then soaked with the lead solution for 20 minutes. Then the solution was pumped through the column at the flow rate of 570 ml/min. The samples were collected about every 40 gallon effluent. The lead concentration was determined by a Perkin-Elmer 3030 Atomic Absorption Spectrophotometer. FIG. 7 shows that the lead removal efficiencies are increased as the number of pads increases.

EXAMPLE 8

AC Fine Dust Test AC Fine Dust (General Motor Corp.) was used widely for air and water filter tests. The particle size distribution provided by the manufacturer is listed below:

| Micrometer | % Less than |
| --- | --- |
| 5.5 | 38+/−3 |
| 11 | 54+/−3 |
| 22 | 71+/−3 |
| 44 | 89+/−3 |
| 176 | 100 |

The test water was prepared by dispersing 0.2 g of AC Fine Dust in 10 liter of city water. Then the test water was pumped through a 13 mm column containing 6 pads of carboxyl media, weighing 1.1 g. The particle sizes and numbers were determined by using Coulter Multisizer (Coulter). The results of influent and effluent were:

| | AC Fine Dust Test Number of Dust Particles in Water | | | |
| --- | --- | --- | --- | --- |
| Particle size Micrometer | Influent | 13 ml/min at 2.0 liter Effluent | 53 ml/min at 2.0 liter Effluent | 0.2 μm Membrane Filtered Water |
| 1.33 | 5571 | 204 | 1057 | 179 |
| 1.48 | 5142 | 199 | 1103 | 207 |
| 1.85 | 4310 | 185 | 968 | 172 |
| 2.31 | 2919 | 137 | 806 | 134 |
| 2.89 | 1905 | 95 | 558 | 99 |
| 3.61 | 1251 | 82 | 313 | 48 |
| 4.50 | 830 | 25 | 160 | 18 |
| 5.62 | 473 | 14 | 80 | 10 |
| 7.01 | 262 | 6 | 43 | 6 |
| 8.76 | 116 | 4 | 26 | 1 |
| 10.93 | 44 | 5 | 14 | 3 |
| 13.64 | 14 | 4 | 21 | 0 |
| 17.03 | 9 | 1 | 6 | 0 |
| 21.26 | 3 | 0 | 2 | 0 |
| 26.54 | 0 | 0 | 0 | 0 |
| 33.13 | 0 | 0 | 0 | 0 |

EXAMPLE 9

The solubility of lead ($Pb^{2+}$) in water is very low at pH higher than 8.5. At this pH, lead hydroxide precipitates and forms colloidal particles. The Literature reports that these lead hydroxide colloids are negatively charged. In order to confirm that the ion-exchange filter media of this invention has a high filtration efficiency, the following tests were performed with spiked Meriden City (Connecticut) water containing 170 ppb lead (nitrate) at pH 8.5.

Figure 8:
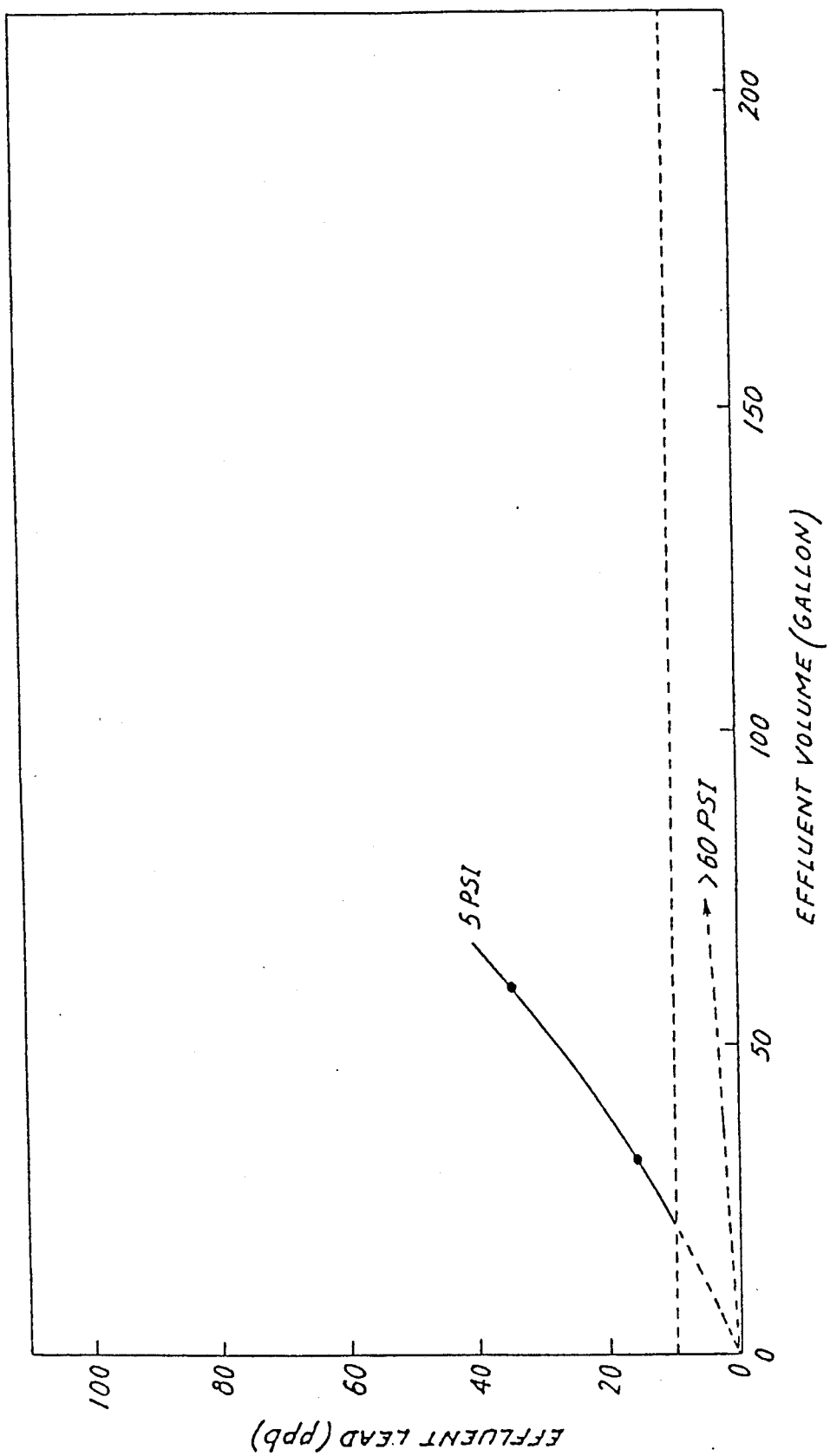
FIG. 8 is a graph depicting lead hydroxide reduction tests with methacrylic acid-modified media.

The spiked city water was first filtered through a 0.45 micrometer Nylon 6,6 membrane. The filtered water had the same lead concentration as unfiltered water, which indicated that the lead hydroxide colloids are smaller than 0.45 micrometer. The water was then pumped through two 37 mm columns simultaneously at 570 ml/min. Each column contained 6 pads weighing 8.5+/−0.1 g. The differences between these pads in the columns are heat cured. The heat curing time of the pads in the column 1 and 2 are 40 and 20 minutes at 150° C. in the presence of R4308 resin. The fully cured pads showed the lowest pressure (column 1), and the partially cured pads showed the highest pressure (FIG. 8).

Column 1 showed early breakthrough (10 ppb level). Column 2 showed no breakthrough even at 60 gallons effluent. The results indicate the insoluble lead hydroxide was removed by a negatively charged filter. The only explanation for such result was the high filtration efficiencies of these filters.

EXAMPLE 10

Lead Removal from Meriden City Water at pH 8.5

The Meriden City water used for this test was the same as in Example 7. The concentrated lead chloride solution (500 ppm) at pH 4.0 was slowly added, with agitation, to the city water (pH~7.5) to make 170 ppb lead concentration. 1 M KOH solution was then added dropwise to adjust the pH to 8.5. After the pH was stabilized for 10 minutes, the "spiked" water was pumped into a column containing the poly(methacrylic acid)-modified media made by Examples 1 and 4 (No. 28). The stacked pads within the column weighed 99.0 grams. The column was 3½ inch in diameter and 3½ inch in height. The flow rate was 0.5 GPM and generated 7–10 psi pressure drop during testing. The flow volume was 900 gallons when 10 ppb lead was detected in the effluent. The results indicate that the media of this invention removed precipitated lead hydroxide efficiently.

EXAMPLE 11

The Freudlich adsorption equation can be used to estimate static capacity at a broad range of equilibrium concentrations of metal ions. This equation is usually written:

$$X/M = KC^{1/n}$$

in which
 $X$ = m moles of impurity removal.
 $M$ = weight of ion-exchange media.
 $C$ = concentration (m mole/l) of ions remaining in solution at equilibrium.
 $K, n$ = constants.
This equation can be rewritten in logarithmic form:

$$\log (X/M) = \log K - 1/n \log C$$

We can plot this equation on logarithmic paper in terms of X/M vs C. The slope of this equation will be equal to 1/n, and X/M is equal to K when C=1.

Figure 9:
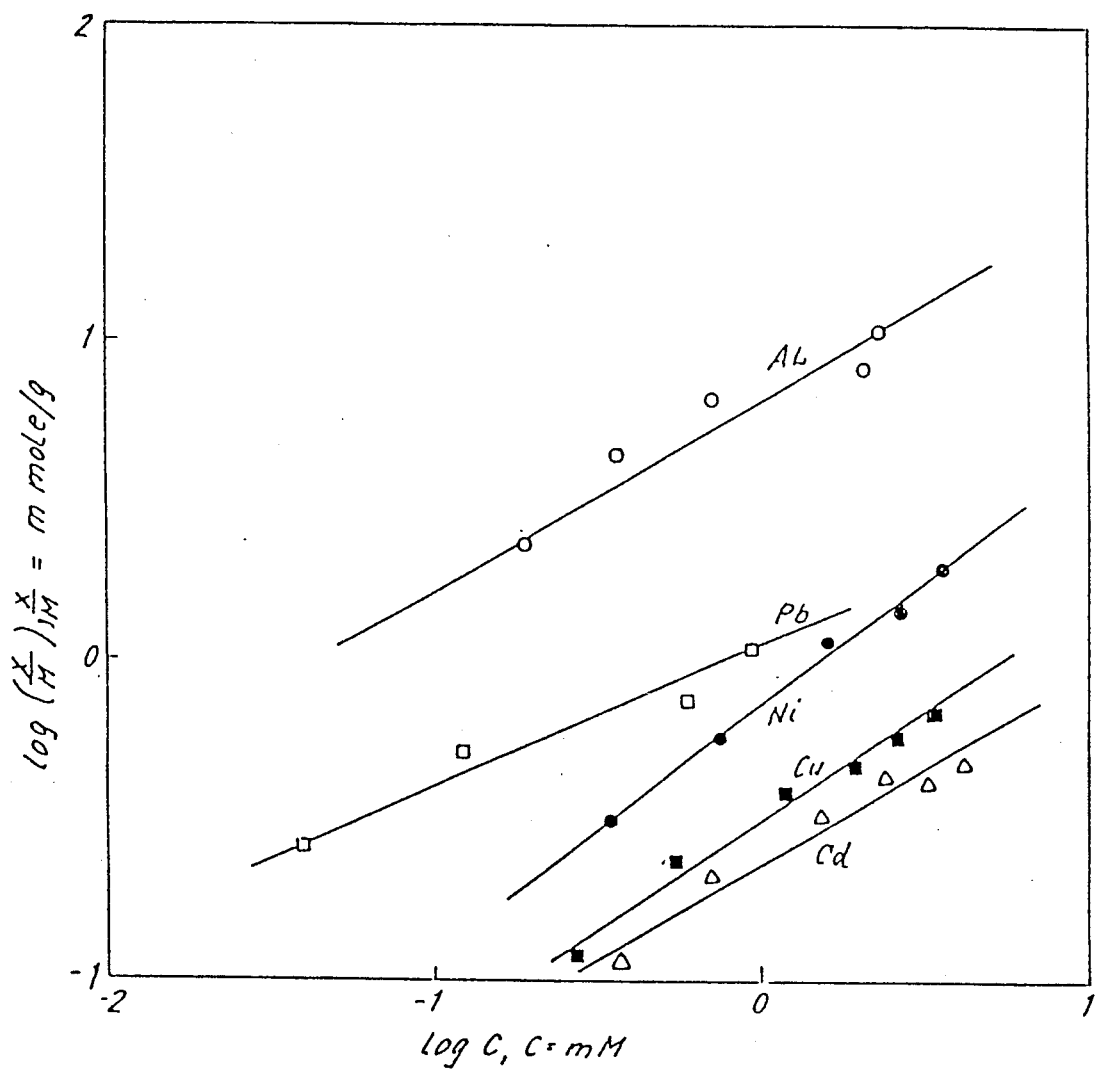
FIG. 9 is a graph of adsorption isotherms of various metals at pH 4.5.

The adsorption results at pH 4.5 of Al, Pb, Ni, Cu and Cd are plotted in FIG. 9. The calculated K and 1/n are listed as follows:

| Metal Ion | K | 1/n |
| --- | --- | --- |
| $Al^{3+}$ | 6.47 | 0.59 |
| $Pb^{2+}$ | 1.11 | 0.43 |
| $Ni^{2+}$ | 0.70 | 0.80 |
| $Cu^{2+}$ | 0.31 | 0.67 |
| $Cd^{2+}$ | 0.25 | 0.55 |

EXAMPLE 12

Poly (methacrylic acid)-g-cellulose/polymer particles

Recipe

| Reagent | Quantity |
| --- | --- |
| Cellulose Fiber (−120 CSF) | 30.0 g |
| Polymer particles | 53.3 g |

-continued

| Reagent | Quantity |
| --- | --- |
| Phenol-Formaldehyde or melamine-formaldehyde Charge Modifier. Hercules 4308 | 0.70 ml |
| Methacrylic Acid | 120 ml |
| Divinyl Benzene | 3 ml |
| Diethylamino Ethyl Methacrylate | 10 ml |
| Glycidyl Methacrylate | 10 ml |
| Ammonium Persulfate | 0.5 g |
| Sodium Thiosulfate | 0.5 g |
| Water | 1500 ml |

B. Procedure

1. Polymer particle was well dispersed in water in a 3 liter reactor.
2. Charge modifier was added into the reactor, stirred for 30 minutes.
3. Cellulose was added and dispersed under $N_2$ atmosphere at 60° C.
4. Add methacrylic acid, diethylaminoethyl methacrylate glycidyl methacrylate, and divinyl benzene.
5. Add 10 ml of ammonium persulfate and 10 ml of sodium thiosulfate solutions into the reactor.
6. The slurry was stirred and heated to 80°-90° C. for 1 hour.
7. The slurry was then neutralized with KOH solution to pH 9.0, filtered and washed.

C. Results

The capacity of the media was analyzed by using the method described in Example 1, in a 100 ml of 1000 ppm lead solution. The capacity was in the range of 360–410 mg-Pb/g media.

EXAMPLE 13

Iminodiacetic Acid and Methacrylic Acid Modified Cellulose and Polymer Particles A. Recipe

| Reagent | Quantity |
| --- | --- |
| Cellulose Fiber (+120 CSF) | 5.0 g |
| Phenol formaldehyde particle | 10.5 g |
| Charge Modifier. Hercules 4308 | 0.5 ml |
| Methacrylic Acid | 5.0 ml |
| Diethyaminoethyl methacrylate | 1.5 ml |
| Glycidyl Methacrylate | 10.0 ml |
| Divinyl Benzene | 0.4 ml |
| Ammonium Persulfate | 0.2 g |
| Sodium Thiosulfate | 0.2 g |
| Iminodiacetic Acid | 10.0 g |
| 6M NaOH | |
| Water | 250 ml |

B. Procedure

1. Phenol formaldehyde polymer particles are dispersed in water in a 1 liter reactor.
2. Charge modifier was added into the reactor, stirred for 20 minutes.
3. Cellulose was added and dispersed under $N_2$ atmosphere at 50° C.
4. Add methacrylic acid, diethylaminoethyl methacrylate, glycidyl methacrylate, and divinyl benzene.
5. Add 5 ml of ammonium persulfate and 5 ml of sodium thiosulfate solutions into the reactor.
6. The slurry was stirred and heated to 80° C. for 30 minutes.
7. Adjust the slurry to pH 9.5 with NaOH.
8. Add concentrated iminodiacetic acid solution preadjusted to pH 9.5 with NaOH.
9. Keep the pH of the slurry between 9.0-9.5.
10. The reaction maintained at 80° C. for 4 hours.
11. Cool the slurry and wash with deionized water.

C. Results

The capacity of the media was analyzed by using the method described in Example 1. The capacity was 185–210 mg Pb/g media.

What is claimed is:

1. A method of removing heavy metal ions from an aqueous solution contaminated therewith comprising contacting said aqueous solution with an ion-exchange media comprising a modified polysaccharide material and a modified particulate polymer material, said modified materials comprising a polysaccharide and particulate polymer material covalently bonded to a synthetic polymer, said synthetic polymer comprising a copolymer produced from a polymerization of:
   (a) a polymerizable compound having a chemical group capable of covalently coupling, directly or indirectly, to said materials; and
   (b) a polymerizable compound containing (i) an ionizable chemical group or (ii) a chemical group capable of transformation to an ionizable chemical group.

2. The method of claim 1, wherein the synthetic polymer is a copolymer made from a free radical polymerization of:
   (a) a polymerizable compound containing an epoxy group capable of direct covalent coupling to a hydroxy group of said materials and a vinyl group, capable of free-radical polymerization; and
   (b) a polymerizable compound having the formula $$R-CO-O-R_1$$

wherein R is an alpha, beta-unsaturated polymerizable radical, and $R_1$ is H, $-C_6H_5COOH$ or $-C_2H_4COOH$.

3. The method of claim 1, wherein the heavy metal ion is lead.

4. The method of claim 1, wherein the heavy metal ion is zinc.

5. The method of claim 1, wherein the heavy metal ion is copper.

6. The method of claim 1, wherein the heavy metal ion is cadmium.

7. The method of claim 1, wherein the heavy metal ion is nickel.

8. The method of claim 1, wherein the aqueous solution contains other ions.

9. The method of claim 8, wherein said other ions are calcium.

10. The method of claim 1, wherein the ion are included in a metal precipitate.

11. The method of claim 1, wherein the particulate polymer is phenol formaldehyde or melamine formaldehyde.

\* \* \* \* \*